United States Patent
Casal Gomez et al.

(10) Patent No.: US 11,438,660 B2
(45) Date of Patent: Sep. 6, 2022

(54) INSERTING SECONDARY CONTENT IN PRIMARY CONTENT IN IPTV

(71) Applicant: Koninklijke KPN N.V., Rotterdam (NL)

(72) Inventors: Alejandro Casal Gomez, The Hague (NL); Dolf Schinkel, Hillegom (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 0 days.

(21) Appl. No.: 17/054,418

(22) PCT Filed: May 22, 2019

(86) PCT No.: PCT/EP2019/063207
§ 371 (c)(1),
(2) Date: Nov. 10, 2020

(87) PCT Pub. No.: WO2019/224241
PCT Pub. Date: Nov. 28, 2019

(65) Prior Publication Data
US 2021/0227296 A1    Jul. 22, 2021

(30) Foreign Application Priority Data
May 23, 2018  (EP) .................... 18173732.1

(51) Int. Cl.
*H04N 21/4627* (2011.01)
*H04N 21/237* (2011.01)
(Continued)

(52) U.S. Cl.
CPC ....... *H04N 21/4627* (2013.01); *H04N 21/237* (2013.01); *H04N 21/64715* (2013.01); *H04N 21/812* (2013.01); *H04N 21/8547* (2013.01)

(58) Field of Classification Search
CPC ............ H04N 21/4627; H04N 21/237; H04N 21/64715; H04N 21/812; H04N 21/8547
See application file for complete search history.

(56) References Cited

U.S. PATENT DOCUMENTS 6,069,952 A * 5/2000 Saito ...................... G06F 21/10
                                                    348/E7.056
6,449,717 B1 * 9/2002 Saito ...................... G06F 21/10
                                                    348/E7.056
(Continued)

OTHER PUBLICATIONS

PCT International Search Report and Written Opinion for International Application No. PCT/EP2019/063207, entitled "Inserting Secondary Content in Primary Content in IPTV," dated Jun. 17, 2019.

(Continued)

*Primary Examiner* — Jefferey F Harold
*Assistant Examiner* — Timothy R Newlin
(74) *Attorney, Agent, or Firm* — Hamilton, Brook, Smith & Reynolds, P.C.

(57) ABSTRACT

The invention is concerned with insertion of secondary content in a time slot of primary content. The primary content and the secondary content are provided to a receiver via a managed content delivery network configured for IPTV delivery. The secondary content may be personalized content, such as an ad. Both the primary content and the secondary content may be encrypted, and decryptable with different decryption keys. Measures are described for pre-caching the decryption key for the secondary content at the receiver ahead of a scheduled play-out time of the secondary content. By pre-caching the decryption key, an interruption in play-out may be avoided or reduced compared to a basic scenario in which the receiver requests the decryption key at or immediately before the scheduled play-out time.

12 Claims, 12 Drawing Sheets

(51) Int. Cl.
*H04N 21/647* (2011.01)
*H04N 21/81* (2011.01)
*H04N 21/8547* (2011.01)

(56) References Cited

U.S. PATENT DOCUMENTS

| | | | | |
|---|---|---|---|---|
| 9,027,143 | B1* | 5/2015 | Agrawal | G06F 21/51 |
| | | | | 726/26 |
| 9,674,567 | B1* | 6/2017 | Carter | H04N 21/812 |
| 10,289,809 | B1* | 5/2019 | Hesselink | H04N 21/2541 |
| 10,694,226 | B1* | 6/2020 | Demsey | H04N 21/6581 |
| 2002/0170053 | A1* | 11/2002 | Peterka | H04N 7/1675 |
| | | | | 725/31 |
| 2006/0287956 | A1* | 12/2006 | Higashi | H04N 7/163 |
| | | | | 705/51 |
| 2007/0076870 | A1* | 4/2007 | Takashima | H04N 21/8352 |
| | | | | 380/200 |
| 2009/0070807 | A1* | 3/2009 | Jacobs | H04N 21/23424 |
| | | | | 725/36 |
| 2009/0285391 | A1* | 11/2009 | Johnson | H04N 21/4367 |
| | | | | 380/200 |
| 2010/0183148 | A1* | 7/2010 | Bellwood | H04N 21/2541 |
| | | | | 380/44 |
| 2010/0189131 | A1* | 7/2010 | Branam | H04N 21/44016 |
| | | | | 370/474 |
| 2010/0198687 | A1* | 8/2010 | Bang | H04N 21/8355 |
| | | | | 705/14.53 |
| 2010/0275226 | A1* | 10/2010 | Kitazato | H04N 21/472 |
| | | | | 725/32 |
| 2011/0110516 | A1* | 5/2011 | Satoh | H04N 21/4627 |
| | | | | 380/201 |
| 2013/0097634 | A1* | 4/2013 | Jin | H04N 21/25841 |
| | | | | 725/34 |
| 2014/0165095 | A1* | 6/2014 | Miller | H04N 21/44016 |
| | | | | 725/34 |
| 2015/0180873 | A1 | 6/2015 | Mooij et al. | |
| 2015/0180879 | A1* | 6/2015 | Hardt | H04L 63/105 |
| | | | | 726/4 |
| 2015/0326393 | A1* | 11/2015 | Takashima | H04N 21/8358 |
| | | | | 380/30 |
| 2017/0347152 | A1* | 11/2017 | Yam | H04N 21/44222 |
| 2021/0227296 | A1* | 7/2021 | Casal Gomez | H04N 21/812 |

OTHER PUBLICATIONS

Kawamori, "IPTV Standardization at ITU-T," retrieved from the Internet, https://www.itu.int/en/ITU-T/gsi/iptv/Documents/tech/1002-Singapore-JDA-APT-WS-IPTV-Overview.pdf; 92 pages, No Date Given.

European Extended Search Report for European Application No. 18173732.1, entitled "Inserting Secondary Content in Primary Content in IPTV," dated Aug. 8, 2018.

SCTE 35 version 2017, as obtained from: http://www.scte.org/SCTEDocs/Standards/SCTE%2035%202017.org, 7 pages, Nov. 2020.

Society of Cable Telecommunications Engineers Standards, ANSI/SCTE 35 2017, "Digital Program Insertion Cueing Message for Cable," 75 pages.

* cited by examiner

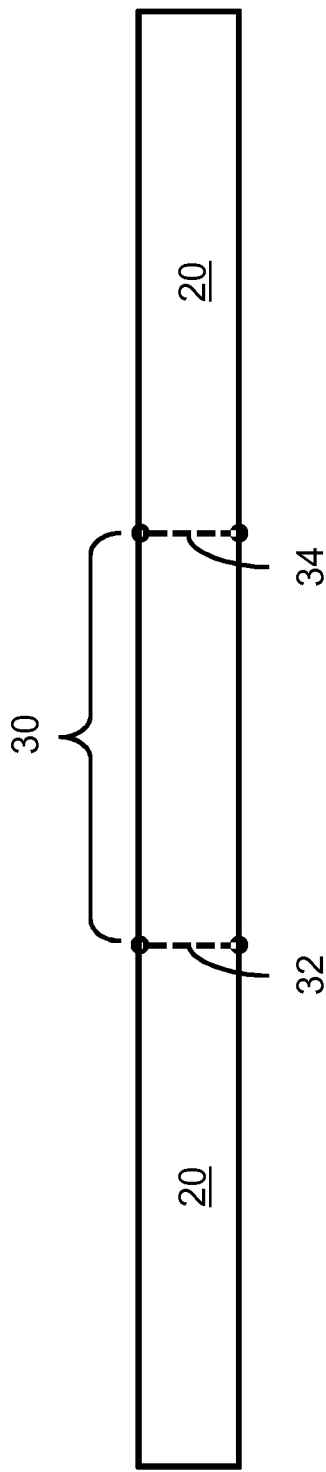
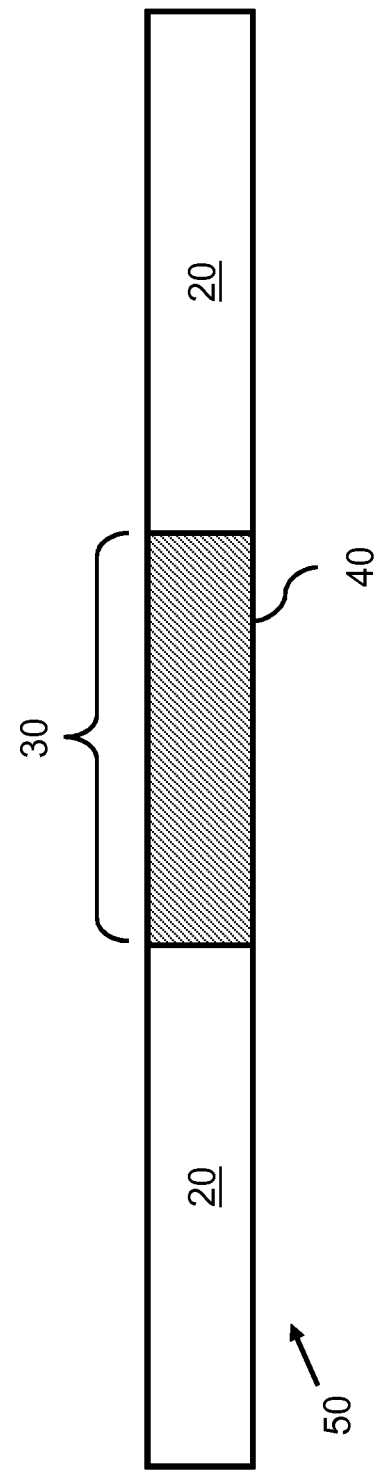
Fig. 1A
Fig. 1B

INSERTING SECONDARY CONTENT IN PRIMARY CONTENT IN IPTV

This application is the U.S. National Stage of International Application No. PCT/EP2019/063207, filed May 22, 2019, which designates the U.S., published in English, and claims priority under 35 U.S.C. § 119 or 365(c) to EP Application No. 18173732.1, filed May 23, 2018. The entire teachings of the above applications are incorporated herein by reference.

FIELD OF THE INVENTION

The invention relates to IPTV, and specifically to the IPTV-based delivery of primary content via a managed content delivery network to a receiver and to the insertion of secondary content, such as an ad, in a time slot of the primary content.

The invention further relates to a computer program comprising instructions for causing a processor system to perform the method, or parts of the method.

The invention further relates to a receiver configured to play-out the primary content with the inserted secondary content, and to a content delivery server configured to deliver the primary content and the secondary content to the receiver.

BACKGROUND ART

IPTV, which stands for Internet Protocol Television, refers to the delivery of television using the Internet Protocol, with the term 'television' not implying a limitation to broadcast television content but rather including any type of video or multimedia content. Such content may be delivered in IPTV via public networks such as the Internet, but also via private, non-public networks. The latter type of networks are generally referred to as 'managed' networks and may include content delivery networks operated or at least managed by mobile or fixed line network operators.

IPTV-based delivery of content is increasing in popularity with consumers, for example, as it enables a wide choice of content and may allow on-demand consumption of content or the consumption of linear programs which have been previously recorded. IPTV in many cases also allows users to skip ads, which users increasingly choose to do in case the ads are not relevant to the users.

Ad companies seek to address this problem by providing personalized ads to users which are more relevant to those users and thus less likely to be skipped. Such personalization may be for a specific user but also to a group of users, e.g., those which share one or more interests, live in a same geographical area, etc.

The personalized ad may then be inserted into a time slot in primary content which is available for the insertion of such ads. Here, 'primary content' refers to the main content which is intended to be consumed by the user, e.g., a television show, movie, etc. The time slot may be a part of the content timeline which is reserved for the insertion of ads and which may contain content which may be replaced. For example, the time slot may designate a part of the content timeline which contains a non-personalized ad which then may be replaced by a personalized ad. In another example, a timeslot may be created during play-out of the primary content by a receiver. For example, a timestamp may be signaled to the receiver which causes the receiver to pause play-out of the primary content when reaching the timestamp, play-out the personalized content and thereafter resume play-out of the primary content.

Such ad insertion or ad replacement is known per se. For example, the SCTE-35 standard [1] describes a mechanism to signal a local ad insertion opportunity in a transport stream. Besides the use for ads, such ad insertion/replacement mechanisms may also be used for the insertion of any other type of personalized content, e.g., to replace a national news program by a local news program, etc.

Disadvantageously, there is currently no adequate mechanism to allow for the insertion of personalized content in a network environment in which content is encrypted. An example of such an environment is the managed network of a mobile or fixed line network operator in which content may be encrypted, for example, to comply with requirements of content providers in terms of security and content protection.

REFERENCES

[1] SCTE 35 version 2017, as obtained from http://www.scte.org/SCTEDocs/Standards/SCTE%2035%202017.pdf.

SUMMARY OF THE INVENTION

It would be desirable to enable the insertion of personalized content in IPTV in a network environment in which content is encrypted. In particular, it may be desirably to enable the insertion of personalized content in case where personalized content is decryptable with a different decryption key than the primary content.

The following measures address the above problem as described within the context of personalized content. However, the measures may be equally applied to any type of secondary content which is to be inserted into a time slot of primary content and which is decryptable with a different decryption key than the primary content.

In accordance with a first aspect of the invention, a method may be provided for enabling insertion of secondary content in a time slot of primary content using a managed content delivery network configured for IPTV delivery.

The method may comprise:
  via the managed content delivery network, providing the primary content to a receiver for play-out by the receiver, the primary content being encrypted with a first encryption key and decryptable with a first decryption key;
  via the managed content delivery network, providing insertion metadata to the receiver indicating the time slot in the primary content for the insertion of the secondary content;
  via the managed content delivery network, providing the secondary content to the receiver, the secondary content being encrypted with a second encryption key and decryptable with a second decryption key which is different from the first decryption key; and
  pre-caching the second decryption key at the receiver before the receiver reaches a start of the time slot during play-out of the primary content, thereby enabling the receiver to decrypt the secondary content with the second decryption key before or during play-out of the secondary content.

In accordance with the above measures, primary content may be delivered via the managed content delivery network to a receiver for play-out. Here, the term 'via' may refer to the delivery taking at least in part place via the managed content delivery network. This delivery, however, may also include one or more other networks, such as the Internet. The delivery via the managed content delivery network may be IPTV based, e.g., based on unicast and/or multicast streaming of content and may adhere to an IPTV standard such as those defined by the ITU-T IPTV Global Standardization Initiative (GSI), DVB IP-TV, etc., and may use standardized content delivery techniques such as MPEG-DASH, rather than representing a proprietary solution. For example, the managed content delivery network may adhere to one or more standards indicated in the ITU-T IPTV-Handbook for managed content delivery networks, e.g., as summarized by "*IPTV Standardization at ITU-T*" by Kawamori, https://www.itu.int/en/ITU-T/gsi/iptv/Documents/tech/1002-Singapore-IDA-APT-WS-IPTV-Overview.pdf The primary content may be encrypted with an encryption key which is also referred to as 'first' encryption key and may be decryptable with a 'first' decryption key. It is noted that, in symmetric encryption scenarios, such a decryption key may be the same as the encryption key, while in asymmetric encryption scenarios, the decryption key may be different from the encryption key. The above measures may apply equally to symmetric encryption scenarios as to asymmetric encryption scenarios.

The receiver may be provisioned with the first decryption key using a mechanism which is known per se. As such, when the primary content is delivered to the receiver, the receiver may begin play-out of the primary content as it already has the necessary decryption key for decrypting the primary content.

The receiver may also be provided with secondary content, which may in some embodiments represent personalized content. For example, the secondary content may be personalized for a specific user associated with the receiver or for a group of users associated with a group of receivers, and selectively provided to said receiver(s). The receiver may further be provided with insertion metadata which indicates a time slot in the primary content for insertion of the secondary content. Such providing of secondary content and insertion metadata is known per se.

The secondary content may also be encrypted with an encryption key and decryptable with a decryption key, and in particular with a decryption key which may be different from the first decryption key. For example, the secondary content may have been obtained from a different source than the primary content, e.g., from an ad decision server which is connected to but not part of the managed content delivery network. This decryption key may in the following also be referred to as 'second' decryption key. There are various reasons for such secondary content being encrypted, even ads, for example due to access, security and content protection requirements, such as age restriction, from a content provider of the secondary content.

In this respect, 'decryptable by a second decryption key which is different from the first encryption key' may be understood as the secondary content not being decryptable by the first decryption key but rather needing a second decryption key.

The inventors have considered that in a basic scenario, a receiver receiving the secondary content would be unable to retrieve the second decryption key before the scheduled play-out time of the secondary content, as the receiver would have first to gain knowledge about which secondary content needs to be played-out to be able to retrieve the appropriate (second) decryption key since every secondary content may in principle be encrypted by means of a different secondary encryption key. This information is typically only available to the receiver at or very shortly before the scheduled play-out time, at which time the receiver would still need to obtain the second decryption key, for example by sending a request to a Digital Rights Management (DRM) server and then retrieving the second decryption key. For example, if the insertion metadata is constituted by one or more SCTE-35 markers in a media stream, a conventional receiver may detect the markers approximately 5 seconds before the scheduled play-out of the secondary content, determine that a particular decryption key is needed, and request this decryption key.

Disadvantageously, the requesting and retrieving of the second decryption key from a DRM server at or shortly before the scheduled play-out time of the secondary content is likely to lead to a pause or interruption in play-out, as for example the 5 seconds advance notice of the SCTE-35 markers may not be enough to request and retrieve the second decryption key, start decrypting the secondary content and start play-out of the decrypted secondary content. As such, there may be an interruption in play-out, e.g., a pause, which may not only be noticeable to a user but may in fact be highly distracting to the user. It would be rather preferred to quickly and smoothly switch play-out from the primary content to the secondary content.

For that purpose, the above measures may provision the receiver with the second decryption key already before the receiver reaches a start of the time slot during play-out of the primary content. Various embodiments are conceived, which generally involve pre-caching the second decryption key at the receiver, for example, by provisioning the second decryption key to the receiver ahead of the scheduled play-out of the secondary content and thus without an immediate need for the second decryption key. For example, a content delivery server may parse the insertion metadata to detect the time slot and provision, or effect the provisioning of the second decryption key to the receiver. Such type of provisioning may have as advantage that the receiver already has the second decryption key available at the scheduled play-out time of the secondary content. In alternative embodiments, the receiver itself may effect the pre-caching of the second decryption key. Thereby, an interruption in play-out may be avoided or reduced compared to the basic scenario in which the receiver requests the second decryption key at or immediately before the scheduled play-out time.

In accordance with a further aspect of the invention, a device may be provided which is configured as the aforementioned receiver.

The device may comprise:
a network interface for receiving, via a managed content delivery network:
primary content, encrypted with a first encryption key and decryptable with a first decryption key;
insertion metadata indicating a time slot in the primary content for insertion of secondary content; and
the secondary content, encrypted with a second encryption key and decryptable with a second decryption key which is different from the first decryption key;
a processor system configured to:
play-out the primary content;
pre-cache the second decryption key before a start of the time slot is reached during play-out, for example by requesting the second decryption key from a digital rights management server on the basis of a content identifier of the secondary content before the start of the time slot or by receiving the second decryption key via the managed content delivery network; and decrypt the secondary content with the second decryption key before or during play-out of the secondary content.

In accordance with a further aspect of the invention, a network node or a distributed system of network nodes may be provided which may be configured as the aforementioned content delivery server and which may comprise:

a network interface for providing to a receiver:
primary content, encrypted with a first encryption key and decryptable with a first decryption key;
insertion metadata indicating a time slot in the primary content for insertion of secondary content;

a processor system configured to:
detect the time slot in the primary content on the basis of the insertion metadata;
via the network interface and in response to said detection of the time slot, request a content identifier of the secondary content from a secondary content decision server allowing the secondary content to be retrieved from the managed content delivery network, the secondary content being encrypted with a second encryption key and decryptable with a second decryption key which is different from the first decryption key;
via the network interface, provide the secondary content to the receiver while additionally providing to the receiver:
the second decryption key as previously obtained by content delivery server from a digital rights management server, or
signaling to cause the receiver to request the second decryption key from the digital rights management server.

In an embodiment, the secondary content may represent personalized content which may be selectively provided to the receiver or a group of receivers which includes the receiver. An example of such secondary content is an ad(vertisement).

In an embodiment, the primary content, the insertion metadata and the secondary content may be provided to the receiver by a content delivery server which is located in the managed content delivery network. Content delivery servers are known per se and are in the following also referred to as content delivery network servers or in short CDN servers. An advantage of this embodiment may be that the receiver may be provided with the primary content and the secondary content by a same server, thereby avoiding a need for a separate mechanism to provide the secondary content to the receiver or for the receiver itself to retrieve said content. In addition, content delivery is from the managed content delivery network, which may be preferable in terms of security, content protection and control over the content delivery. In addition, this may ensure a smooth transition between the primary content and the secondary content during play-out at the receiver since it is not needed to rely on another server to ensure the timely delivery of the secondary content to the receiver.

In an embodiment, the method may further comprise, at the content delivery server, detecting the time slot in the primary content on the basis of the insertion metadata, in response to said detection of the time slot, requesting a content identifier of the secondary content from a secondary content decision server allowing the secondary content to be retrieved from the managed content delivery network, and providing the secondary content to the receiver. The content delivery server may timely provide the secondary content to the receiver. For that purpose, it may itself request the secondary content to be identified from a secondary content decision server, such as an Ad Decision Server (ADS), and then retrieve the secondary content on the basis of the content identifier, e.g., from local storage or from another content delivery server in the content delivery network. The phrasing 'retrieved from the managed content delivery network' may thus refer to the secondary content being deliverable from the managed content delivery network, e.g., by being stored on the content delivery server or another content delivery server. Having retrieved the secondary content on the basis of the content identifier, the content delivery server may then deliver the secondary content to the receiver. The receiver thus may not have to directly communicate with the secondary content server, which may be an external server, e.g., located outside of the managed content delivery network.

In an embodiment, providing the secondary content to the receiver may comprise, at the content delivery server, inserting the secondary content in the time slot of the primary content to obtain combined primary and secondary content, and providing the combined primary and secondary content to the receiver. By inserting the secondary content in the time slot, the insertion may be performed 'server-sided' resulting in a combined media stream or other combined data. An advantage of this embodiment may be that delivery of the content to the receiver is simplified as both types of content may be provided to the receiver by a single network entity. It may also not be needed for the receiver itself to be able to insert the secondary content into the primary content. Accordingly, the receiver may be reduced in complexity as well.

In an embodiment, the method may further comprise, at the content delivery server, requesting the second decryption key from a digital rights management server on the basis of the content identifier of the secondary content and optionally an identifier of the receiver, and providing the second decryption key to the receiver. The receiver may be identified in the request for the second decryption key since the secondary decryption key may be specific to the receiver, in that the secondary content may be encrypted using a second encryption key specific to the receiver or a set of receivers. The content delivery server may thus provision both the secondary content and the second decryption key to the receiver. The content delivery server may be considered a 'trusted' server as it resides within the managed content delivery network which may be a 'trusted' network environment as it may be operated or at least managed by an operator, such as a mobile or fixed line network operator. By provisioning the second decryption key from this trusted network environment, the control and security of the key provisioning may be improved over the provisioning of the second decryption key from outside the managed content delivery network.

Another advantage is that this embodiment may allow 'just-in-time encryption', where the content delivery server communicates with the digital rights management server for real-time encryption of content, e.g., of the primary content and/or secondary content.

In an embodiment, the method may further comprise, at the secondary content decision server and in response to the request for the content identifier of the secondary content from the content delivery server, providing a server identifier together with the secondary content to the content delivery server, the server identifier identifying the digital rights management server providing the second decryption key. In case there are multiple DRM servers which may be accessed by the content delivery server, a particular DRM server may be designated by the secondary content decision server, namely by providing an identifier of the DRM server to the content delivery server, such as a network address or any other type of identifier which allows the particular DRM server to be identified.

In an embodiment, the method may further comprise, at the secondary content decision server, in response to the request for the content identifier of the secondary content from the content delivery server, requesting the second decryption key from a digital rights management server on the basis of the content identifier of the secondary content, and providing the second decryption key together with the content identifier of the secondary content to the content delivery server for delivery to the receiver. As an alternative to the content delivery server requesting the second decryption key from a DRM server, the secondary content decision server may also request the second decryption key in response to a request for the content identifier of the secondary content from the content delivery server, and then provide the content identifier of the secondary content together with the second decryption key to the content delivery server. It may thus not be needed for the content delivery server to be able to communicate with a DRM server. Rather, the content delivery server may send a single request to the secondary content decision server, e.g., as a VAST request, and in response, be provided with the content identifier of the secondary content and the accompanying second decryption key. In this respect, it is noted that the content identifier provided to the digital rights management server may be the same but also a different content identifier as requested and provided to the content delivery server.

In an embodiment, providing the second decryption key to the receiver may comprise, at the content delivery server, inserting the secondary content and the second decryption key in a same data container, such as a same media stream, and providing the data container to the receiver. By inserting the second decryption key in a same data container as the secondary content, the second decryption key may be associated with the secondary content. It may thus not be needed to otherwise enable the receiver to associate the second decryption key with the secondary content.

In an embodiment, the method may further comprise, at the content delivery server, signaling the receiver that the combined primary and secondary content received by the receiver contains the secondary content, at the receiver and in response to said signaling, requesting the second decryption key from a digital rights management server on the basis of the content identifier of the secondary content.

In an embodiment, the signaling to the receiver may comprise providing a server identifier to the receiver, the server identifier identifying the digital rights management server providing the second decryption key. In case there are multiple DRM servers which may be accessed by the receiver, a particular DRM server may be designated by the content delivery server, namely by providing an identifier of the DRM server to the receiver, such as a network address or any other type of identifier which allows the particular DRM server to be identified and addressed by the receiver.

In an embodiment, the method may further comprise, at the receiver, detecting the time slot in the primary content on the basis of the insertion metadata, in response to said detection of the time slot, requesting a content identifier of the secondary content from a secondary content decision server allowing the secondary content to be retrieved from the managed content delivery network, and requesting the second decryption key from a digital rights management server on the basis of the content identifier of the secondary content. In accordance with this embodiment, the insertion may be performed 'client-sided' in that the receiver may request the content identifier of the secondary content from the secondary content decision server, which may allow the receiver to retrieve the secondary content from the managed content delivery network. The receiver may then explicitly, or implicitly during play-out, insert the secondary content into the time slot of the primary content. An advantage may be that such 'client-sided' embodiment may enable user control and/or enable user preferences to be into account which are only available locally at the receiver, e.g., in view of privacy.

In an embodiment, requesting the content identifier of the secondary content from the secondary content decision server may comprise sending a Video Ad Serving Template (VAST) request to the secondary content decision server. VAST requests are well suitable for this purpose.

In an embodiment, the primary content may be encoded as a media stream, wherein the insertion metadata may be constituted by one or more markers in the media stream, such as SCTE-35 markers, and wherein detecting the time slot in the primary content on the basis of the insertion metadata may comprise detecting the one or more markers in the media stream.

It will be appreciated by those skilled in the art that two or more of the above-mentioned embodiments, implementations, and/or aspects of the invention may be combined in any way deemed useful.

Modifications and variations of any one of the processor systems, network nodes, devices and/or the computer programs, which correspond to the described modifications and variations of the method, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings, FIG. 1A illustrates primary content having a content timeline which is set out along the horizontal axis, with the primary content comprising a time slot for the insertion of secondary content, such as personalized content including ads, and with the time slot being indicated by a start marker and an end marker;

FIG. 1B illustrates the secondary content having been inserted into the time slot, thereby obtaining combined primary and secondary content;

Figure 2A:
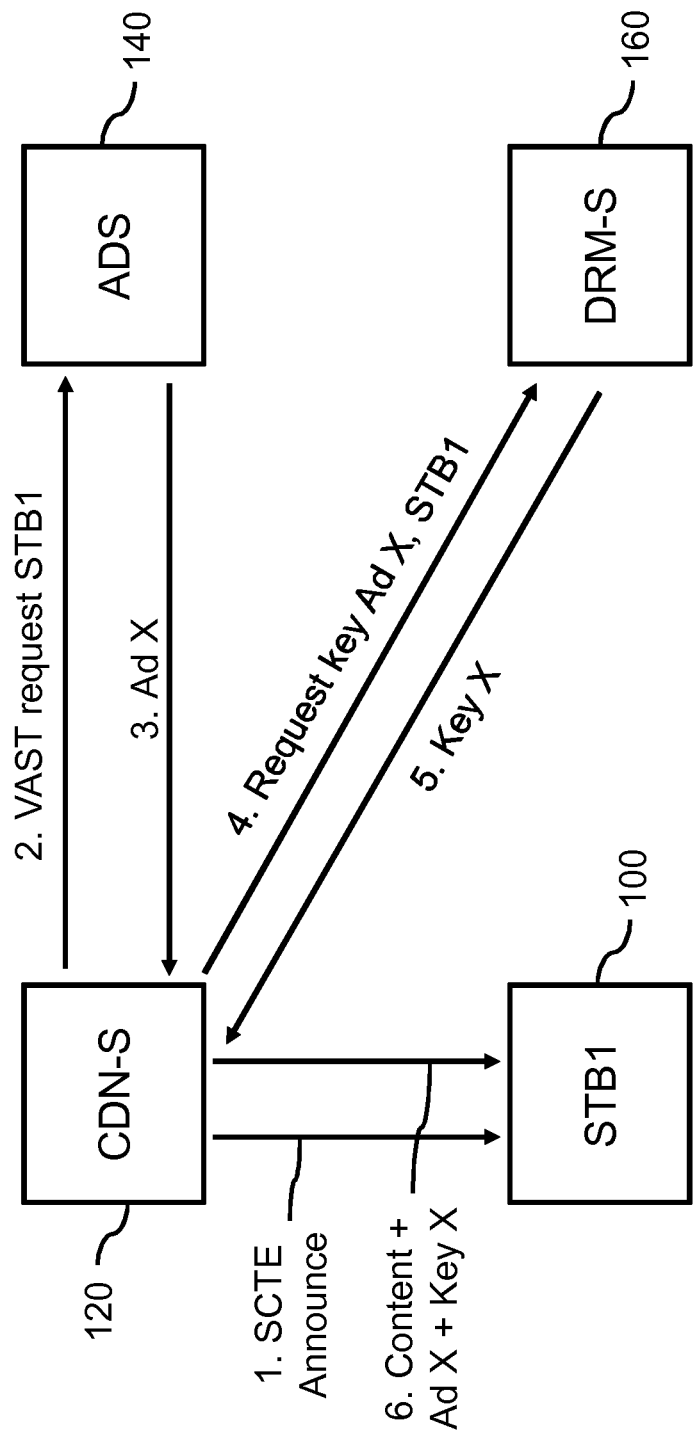
FIG. 2A illustrates a first embodiment in which the insertion of the secondary content is performed by a CDN server, and in which the second decryption key for the secondary content is requested by the CDN server from a DRM server.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

20 primary content
30 time slot for secondary content
32 marker indicating start of time slot
34 marker indicating end of time slot
40 secondary content
50 combined primary and secondary content
100 set-top box (STB)
120 content delivery network server (CDN-S)
140 ad decision server (ADS)
160 digital rights management server (DRM-S)
200 system representing device or server
210 network interface
220 processor system
230 storage
300 computer readable medium
310 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described with the secondary content being, by way of example, personalized content, and in particular an ad(vertisement). However, the measures may apply equally to any other type of secondary content.

In general, the delivery of the secondary content may make use of various techniques which are known per se, such as the use of Video Ad Serving Template (VAST) requests for requesting the secondary content, SCTE-35 markers for signaling insertion opportunities ('avails') for the secondary content, etc. Also, use may be made of Dynamic Ad Substitution (DAS) techniques such as those being defined by DVB-TA (Targeted Advertisement). Some embodiments may build upon the DAS framework defined by DVB-TA. For example, the receiver may be a DAS receiver, the secondary content decision server may be a trusted ad decision server and in-band signaling and traffic mechanisms may be used as described by DVB-TA. The following embodiments describe additions to these techniques and frameworks to handle the secondary content being decryptable with a different decryption key than the primary content.

Primary Content and Time Slot

FIG. 1A illustrates primary content 20 having a content timeline which is set out along the horizontal axis, with the primary content comprising a time slot 30 for the insertion of secondary content. As is known per se, the time slot 30 may represent a part of the primary content which may be replaced by the secondary content. For example, the part of the primary content may contain one or more non-personalized ads which may be replaced by personalized ad(s). Another example is that the part of the primary content may contain national news which may be replaced by local news.

The time slot 30 may be defined or indicated by insertion metadata, which may for example define one or more timestamps or markers indicating, as shown in FIG. 1A, a start 32 and end 34 of the timeslot 30. Alternatively, various other mechanisms may be used to indicate the time slot, for example by specifying a duration of the timeslot 30 instead of the end 34 of the timeslot, or by indicating a content identifier of the content that may be replaced instead of using time-based markers.

Such insertion metadata may be defined and transmitted separately from the primary content, e.g., as a separate data container. In some embodiments, the insertion metadata may be included in a same data container as the primary content, e.g., in a same media stream. In a specific example, the insertion metadata may be represented by one or more SCTE-35 markers, such as markers 32 and 34, which may be provided in the media stream shortly before the content of the time slot 30.

In some embodiments, the time slot 30 may be a time slot which is created by the receiver during play-out, e.g., by pausing the play-out of the primary content 20 when reaching the marker 32, namely for the duration of the time slot 30, by playing-out the secondary content during the time slot 30, and by resuming the play-out of the primary content 20 at the end of the timeslot 30. Effectively, in such embodiments, the secondary content may be inserted at play-out into a time slot created at play-out.

FIG. 1B illustrates the secondary content 30 having been inserted into the time slot 30 in the primary content 20. As will be described with reference to various embodiments, such insertion may take place at the receiver, e.g., during or before play-out, but may also be performed by other entities, such as a content delivery server. The result may be combined primary and secondary content 50. In some examples, the insertion may be performed by inserting a stream-based representation of the secondary content 30 into a stream-based representation of the primary content 20, thereby obtaining a media stream of the primary content 20 which contains the secondary content 40 at the particular time slot 30. If the media stream is provided to the receiver, the media stream may thus have the secondary content 'pre-inserted'.

General

There are several ways to deliver the decryption key for the secondary content in advance to the receiver so as to pre-cache said key at the receiver.

In a so-called 'server-side ad insertion' scenario, as described for example with reference to FIGS. 2A-4B, the second decryption key may be requested by an ad decision server on behalf of the receiver, delivered to the content delivery server via a VAST response, e.g., based on e.g., VAST 3.0 or VAST 4.0, and then sent to the receiver in-band or out-of-band. Another example is that the second decryption key may be requested by the content delivery server and sent to the receiver in-band or out-of-band. Yet another example is that the second decryption key may be requested directly by the receiver, for example as soon as the receiver obtains information about which secondary content is to be inserted into the time slot of the primary content.

Figure 5A:
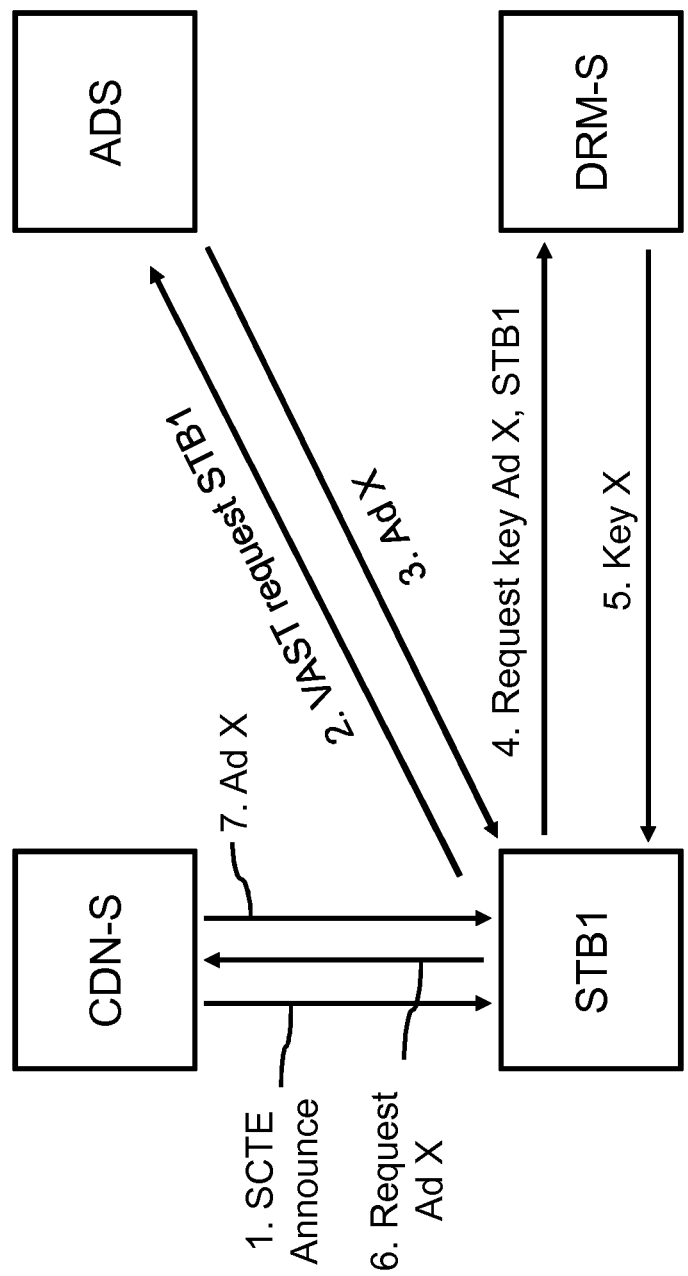
FIG. 5A illustrates a fourth embodiment in which the insertion of the secondary content is performed by the receiver, and in which the second decryption key is requested by the receiver from the DRM server.
Figure 5B:
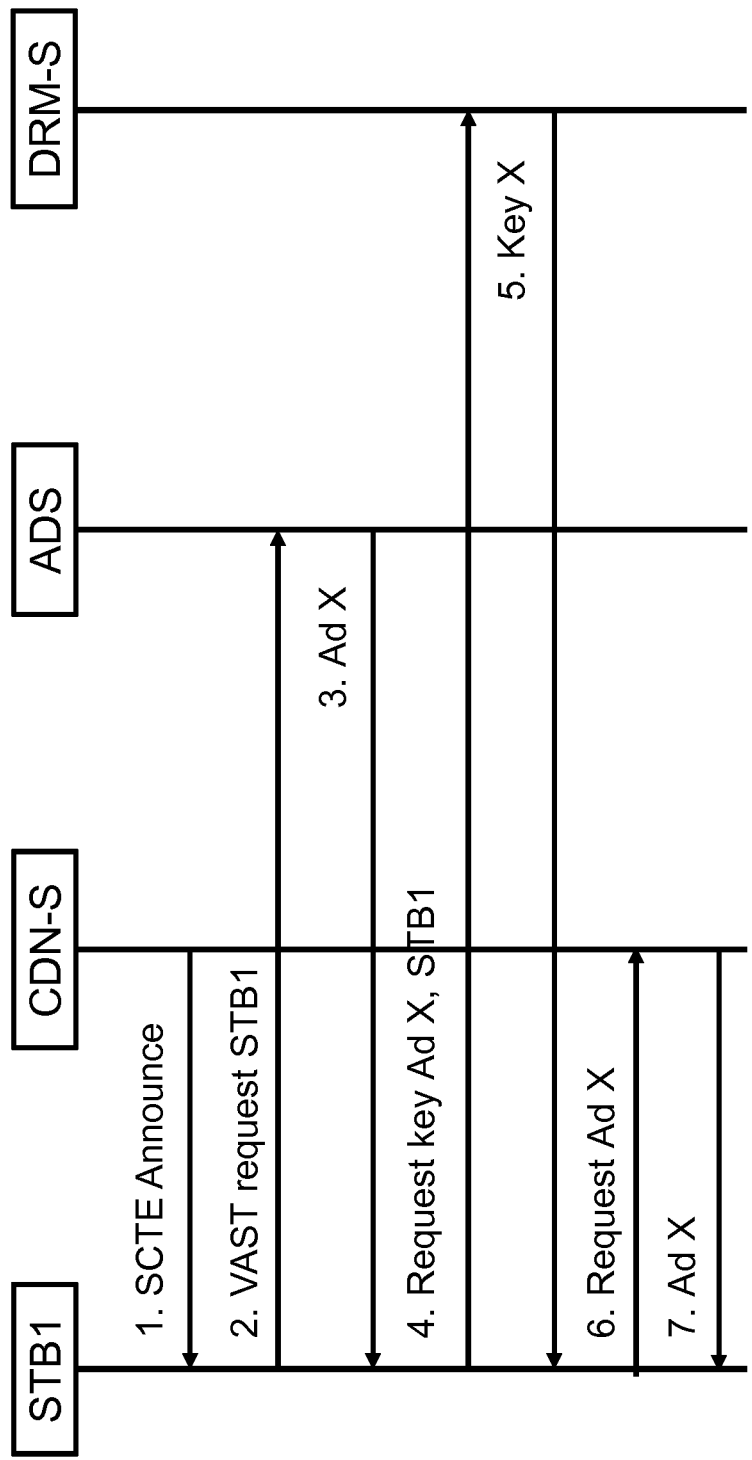
FIG. 5B shows a message exchange corresponding to FIG. 5A.

In a so-called 'client-side ad insertion' scenario, as described for example with reference to FIGS. 5A-5B, an ad decision server may request the second decryption key from the digital rights management server on behalf on the receiver. The ad decision server may deliver the requested key to the receiver as part of a VAST response. In another example, the receiver may directly request the second decryption key from the digital rights management server, for example as soon as the receiver receives the VAST response with information about which secondary content is to be inserted.

Server-Sided Insertion

FIGS. 2A-4B represent so-called 'server-sided insertion' embodiments in which, as also indicated with reference to FIG. 1B, the secondary content may be inserted into a data representation of the primary content by a content delivery network server 120, also referred to as CDN server. In these and further examples, the receiver 100 is, by way of example, a set-top box labeled 'STB1' in the Figures. Various other types of receivers are equally conceivable, such as personal computers, televisions, smart phones, tablets, wearables such as smart glasses, gaming consoles, etc.

Figure 2B:
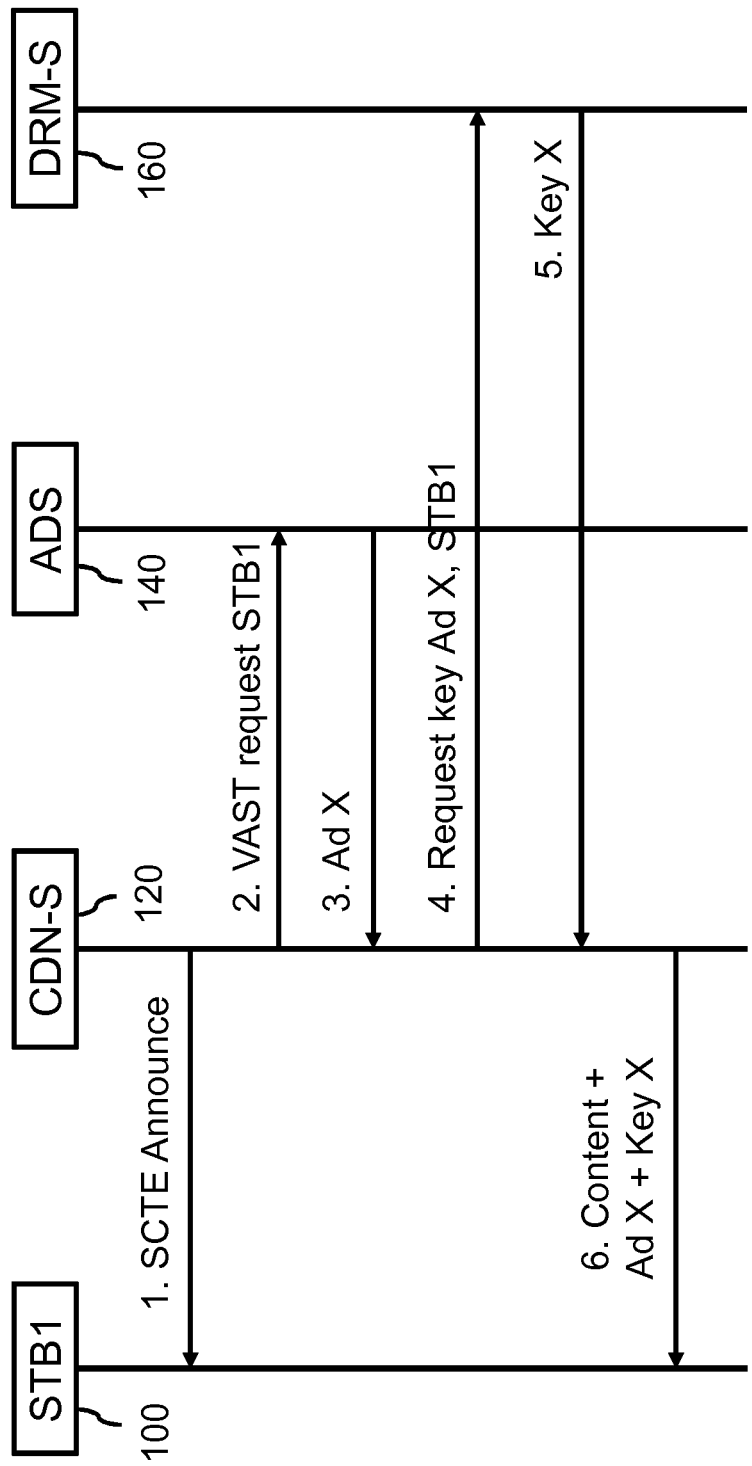
FIG. 2B shows a message exchange corresponding to FIG. 2A.
Figure 3A:
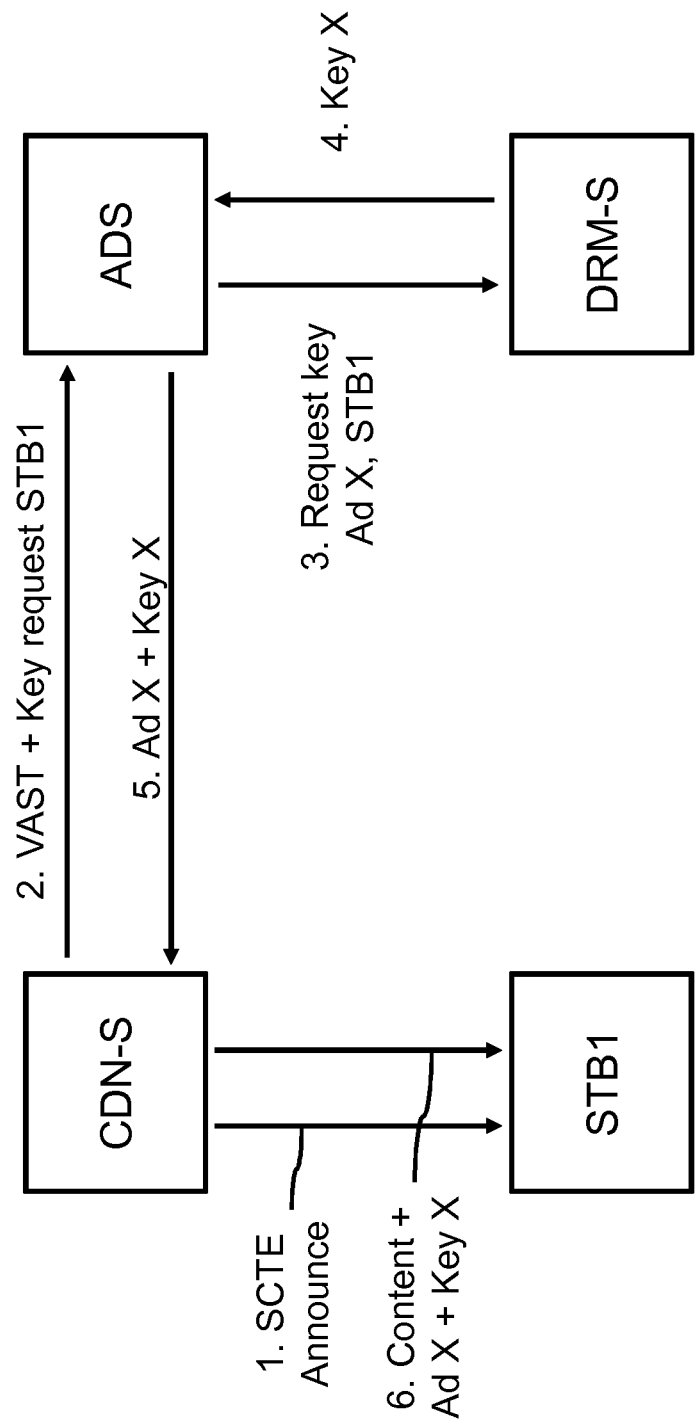
FIG. 3A illustrates a second embodiment in which the insertion of the secondary content is performed by the CDN server, and in which the second decryption key is delivered together with the secondary content by an ad server.
Figure 3B:
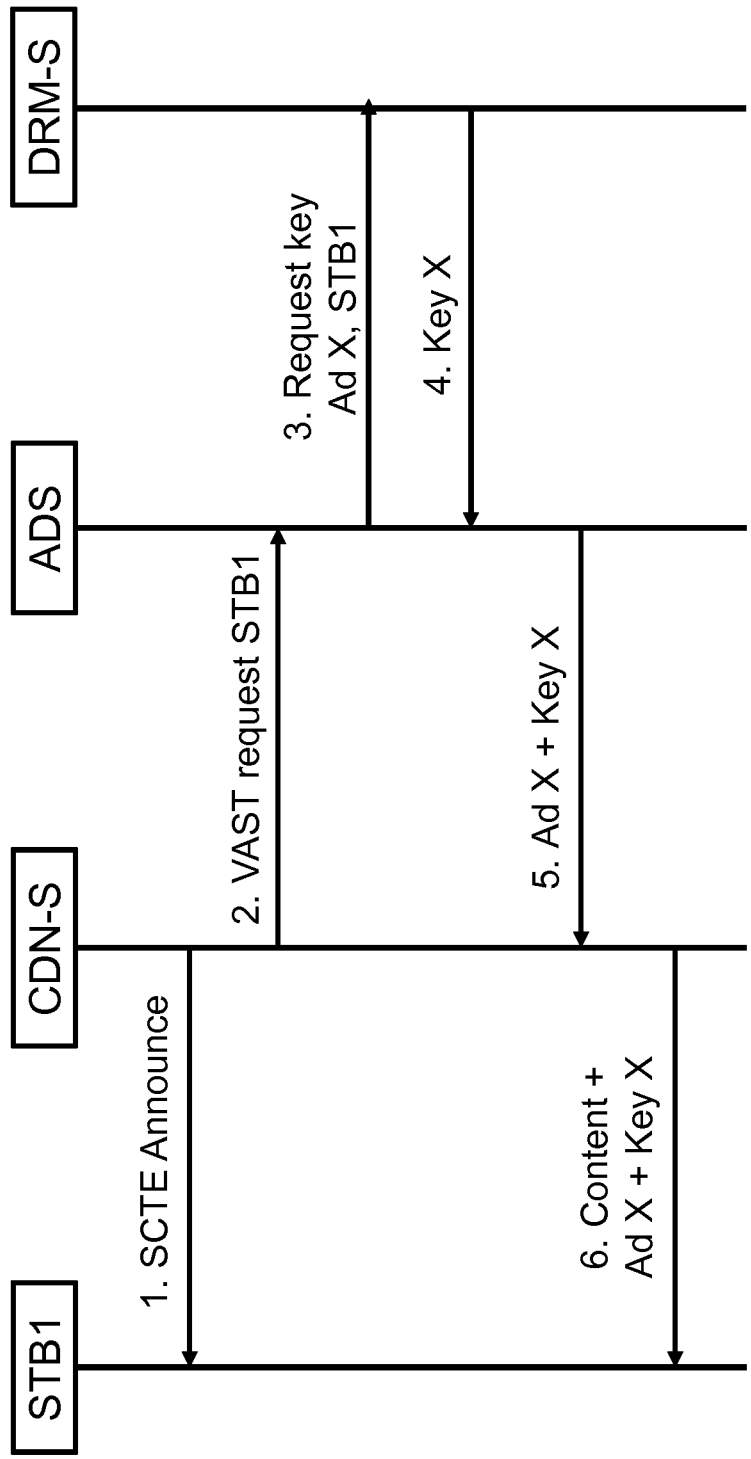
FIG. 3B shows a message exchange corresponding to FIG. 3A.
Figure 4A:
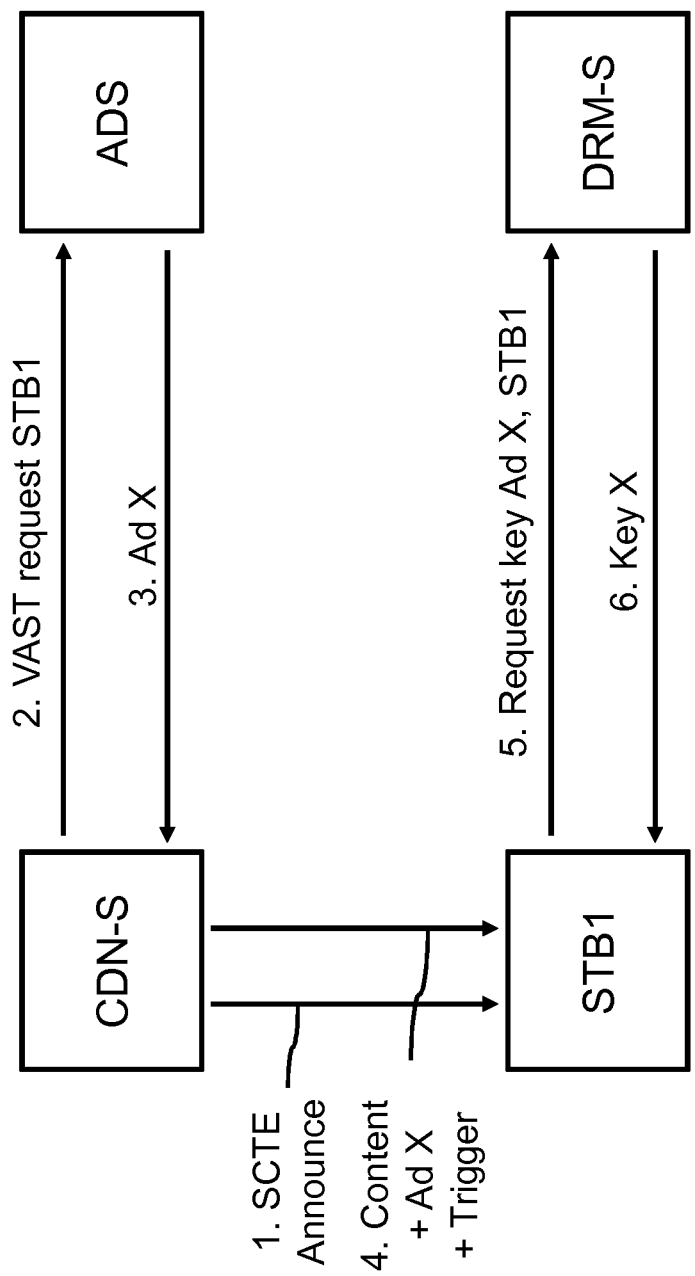
FIG. 4A illustrates a third embodiment in which the insertion of the secondary content is performed by the CDN server, and in which the second decryption key is requested by the receiver from the DRM server.
Figure 4B:
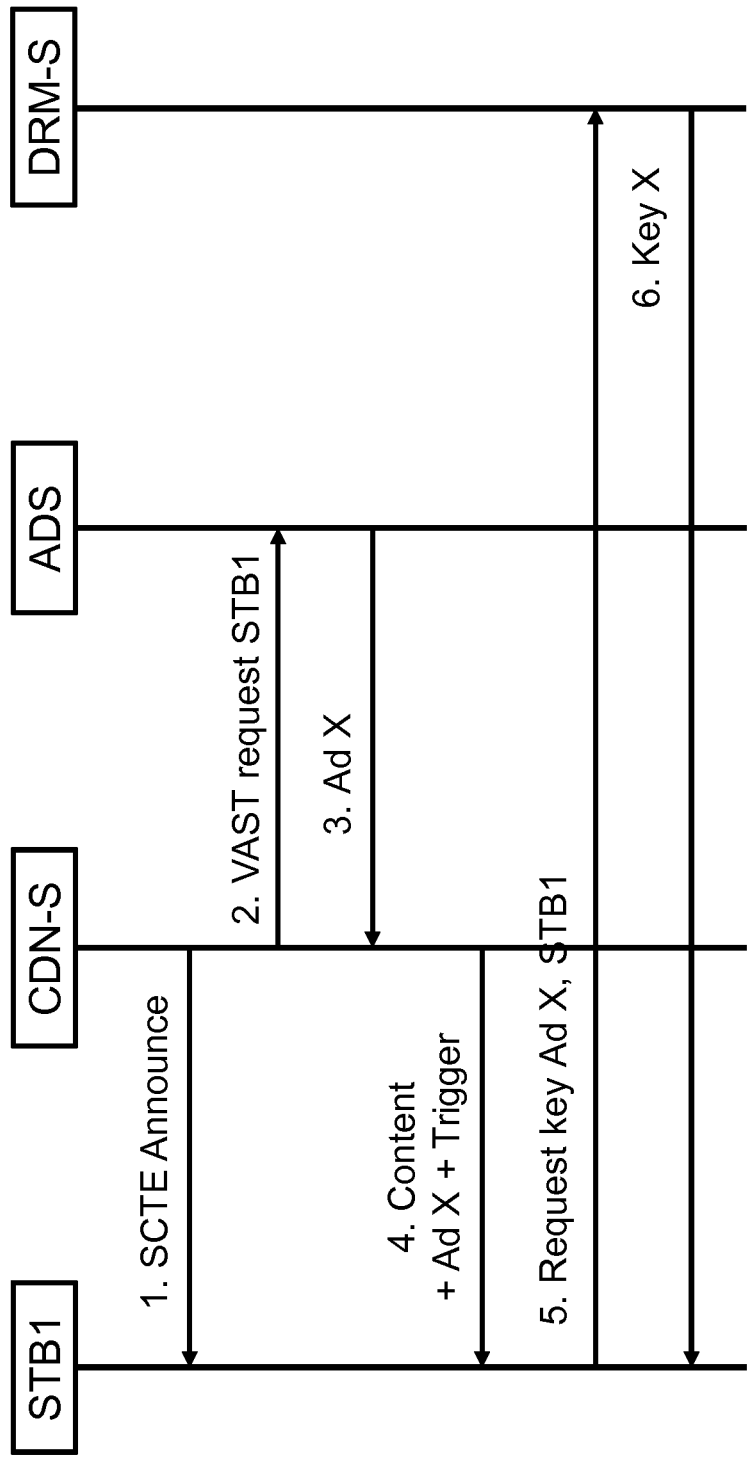
FIG. 4B shows a message exchange corresponding to FIG. 4A.

FIGS. 2A, 3A and 4A each show a respective message exchange in a block diagram of different devices and servers, whereas FIGS. 2B, 3B and 4B each illustrates the respective message exchange set out against time (vertical axis).

In the embodiment of FIGS. 2A and 2B, the CDN server 120 may ensure that the second decryption key is provided to the receiver 100 before the start of the insertion time slot is reached. The latter may also be referred to as 'ad insertion point'.

For that purpose, when the CDN server 120 detects an SCTE announcement in the media stream of the primary content, the SCTE announcement may be signaled to the receiver 100 by way of a message titled 'SCTE Announce'. The CDN server 120 may further send a VAST request to the ad decision server 140 identifying the primary content and the receiver, e.g., 'STB1', in a message titled 'VAST request STB1'. The ad decision server 140 may then respond with the ad to be inserted, e.g., 'Ad X'. Here and in the following, 'responding with the ad' may refer to the ad being identified by the ad decision server, for example by the ad decision server providing a content identifier of the ad, but may in some embodiments also comprise the ad itself being delivered. The ad decision server 140 may further identify the DRM server 160 where the decryption key may be obtained. Such a DRM server parameter may be optional in ecosystems having a single DRM server. Although not explicitly shown in FIGS. 2A and 2B, the CDN server 120 may retrieve Ad X based on the content identifier received from the ad decision server 140, e.g., from local storage, or from another CDN server in the content delivery network if the ad is not already available to the CDN server 120. The CDN server 120 may further request the decryption key for the receiver 100 from the DRM server 160 by way of a message titled 'Request key Ad X, STB1'. After receiving the decryption key, e.g., 'Key X', the CDN server 120 may insert the ad and the decryption key in the stream containing the primary content, for example, by inserting the encrypted ad in a unicast stream and by inserting the decryption key in the unicast stream before the encrypted ad. The result may be streamed to the receiver 100, e.g., by way of a stream titled 'Content+Ad X+ Key X'. Accordingly, the receiver 100 may decrypt Ad X upon after receipt.

FIGS. 3A and 3B illustrate a second embodiment in which the insertion of the secondary content is performed by the CDN server, and in which the second decryption key is delivered together with the secondary content by an ad server.

In this embodiment, which may be considered an alternative to the FIGS. 2A, 2B embodiment, the request for the decryption key may be delegated by the CDN server to the ad decision server ADS. For that purpose, the CDN server may send a combined VAST+DRM key request to the ad decision server ADS, e.g., by way of a message titled 'VAST+ Key request STB1'. The ad decision server ADS may determine that 'Ad X' is to be inserted and may optionally identify the DRM server where the decryption key may be obtained. Such a DRM server parameter may be optional in ecosystems having a single DRM server. Based on said determination, request the corresponding decryption key from the DRM server, e.g., by way of a message titled 'Request key Ad X, STB1'. The ad decision server ADS may then respond with Ad X and the received decryption key for STB1 to the CDN server. Although not explicitly shown in FIGS. 3A and 3B, the CDN server may then retrieve Ad X based on the content identifier, e.g., from local storage or from another CDN server, and then deliver a stream of 'Content+Ad X+ Key X' to the receiver STB1 in a same or similar manner as previously described with reference to FIGS. 2A and 2B.

FIGS. 4A and 4B illustrate a third embodiment in which the insertion of the secondary content is performed by the CDN server, and in which the second decryption key is requested by the receiver STB1 from the DRM server. In a same or similar manner as in the FIGS. 2A and 2B embodiment, when the CDN server detects an SCTE announcement in the media stream of the primary content, the CDN server may send a VAST request to the ad decision server ADS identifying the primary content and the receiver STB1 in a message titled 'VAST request STB1'. The ad decision server ADS may then respond with the ad to be inserted, e.g., 'Ad X', and may optionally identify the DRM server where the decryption key may be obtained. Such a DRM server parameter may be optional in ecosystems having a single DRM server. Although not explicitly shown in FIGS. 4A and 4B, the CDN server may then retrieve Ad X based on a content identifier received from the ad decision server, e.g., from local storage or from another CDN server. The CDN server may then insert the ad in the media stream containing the primary content, as well as insert a trigger notification in the media stream indicating the Ad X that will be inserted and possibly identifying the DRM server where the decryption key for Ad X may be obtained, e.g., by way of a stream 'Content+Ad X+ Trigger'. When the receiver STB1 encounters the trigger notification in the media stream, it may request the decryption key of 'Ad X' for itself from the DRM server, e.g., by way of a message titled 'Request key Ad X, STB1', and after receiving 'Key X' from the DRM server, decrypt and play-out the inserted Ad X using the received decryption key.

Client-Sided Insertion

FIGS. 5A and 5B illustrate a fourth embodiment in which the insertion of the secondary content is performed by the receiver, e.g., a 'client', and in which the second decryption key is requested by the receiver from the DRM server.

In this embodiment, when the receiver STB1 detects the SCTE announcement in the media stream, it may send a VAST request to the ad decision server ADS identifying the primary content and the receiver STB1 in a message titled 'VAST request STB1'. The ad decision server ADS may then respond with the ad to be inserted, e.g., 'Ad X', and may optionally identify the DRM server where the decryption key may be obtained. Such a DRM server parameter may be optional in ecosystems having a single DRM server. The receiver STB1 may then request the decryption key of 'Ad X' for itself from the DRM server by way of a message titled 'Request key Ad X, STB1'. After receiving the decryption key, e.g., 'Key X', the receiver STB1 may request the ad from the CDN server, e.g., by way of a message titled 'Request Ad X' and upon receipt of the 'Ad X', decrypt Ad X with the previously received Key X.

Encryption Using Master Key

Figure 6:
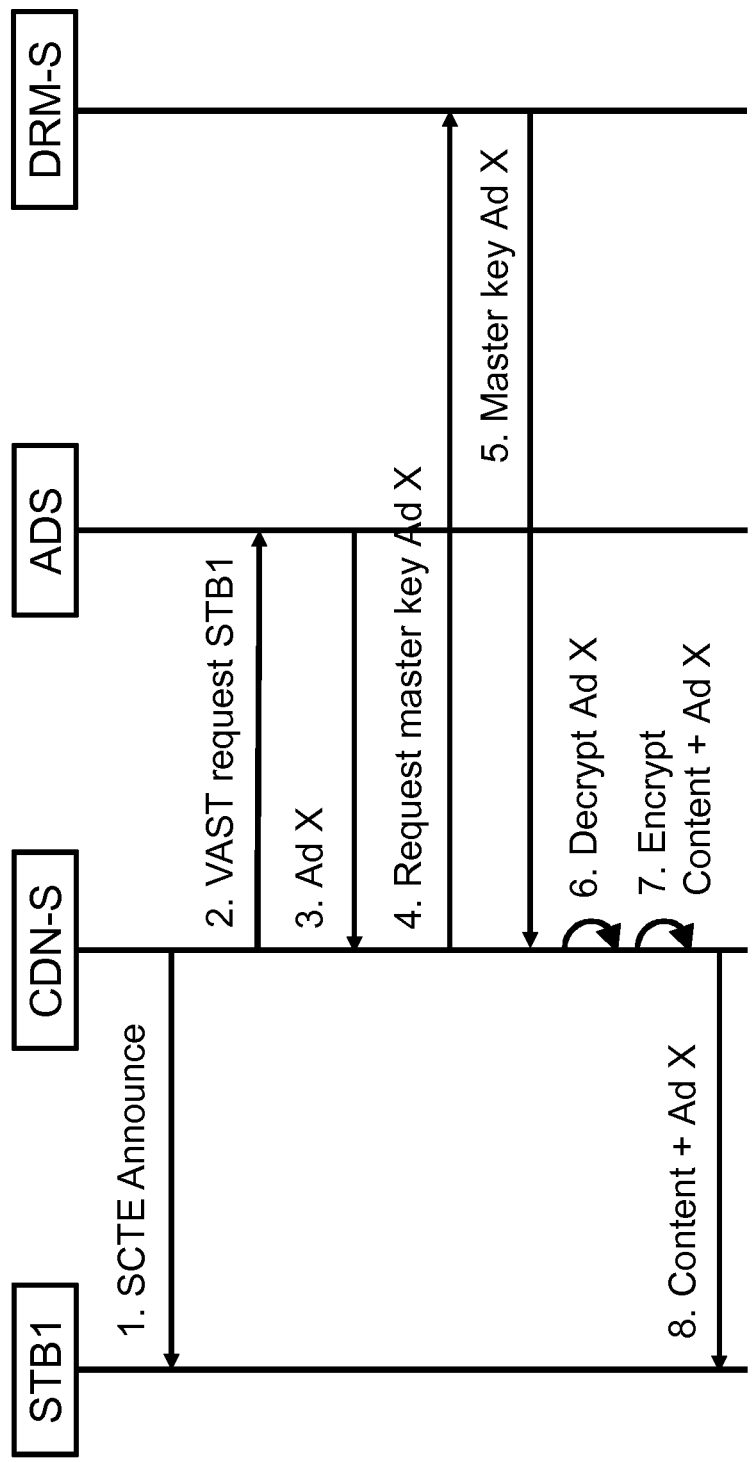
FIG. 6 illustrates a further embodiment in which the secondary content is encrypted by a master key, and in which the CDN server requests the master key, decrypts the secondary content and then on-the-fly encrypts the secondary content together with the primary content using the first decryption key.

FIG. 6 illustrates a further embodiment in which the secondary content is encrypted by a master key, and in which the CDN server requests the master key, decrypts the secondary content and then on-the-fly encrypts the secondary content together with the primary content using the first decryption key.

Some content delivery networks may use the concept of on-the-fly packaging and encryption. This technology may have as advantage having particular content stored only once in the CDN. The content may be stored in a so-called mezzanine format and may be encrypted with a master key in order to meet the requirements from content providers, e.g., to not store content 'in the clear'. Based on a receiver requesting the particular content, a CDN server may decrypt the content with the master key, and then package and encrypt the content in real-time in a format that is supported by the receiver. Such on-the-fly encryption may be combined with server-side insertion of secondary content as shown in FIG. 6 and described as follows.

When the CDN server detects an SCTE announcement in the media stream of the primary content, the CDN server may send a VAST request to the ad decision server ADS identifying the primary content and the receiver STB1 in a message titled 'VAST request STB1'. The ad decision server ADS may then respond with the ad to be inserted, e.g., 'Ad X', and may optionally identify the DRM server where the decryption key may be obtained. Such a DRM server parameter may be optional in ecosystems having a single DRM server. The CDN server may then request the master key from the DRM server by way of a message titled 'Request master key Ad X'. After receiving the master key 'Master key Ad X', the CDN server may decrypt Ad X using the master key, e.g., in a process titled 'Decrypt Ad X', and then, in a process titled 'Encrypt Content+Ad X', perform an on-the-fly packaging and encryption of Ad X using a same packaging format and same key as is used for encrypting the primary content. This way, the inserted Ad X may be readily decrypted by the receiver STB1 since it is encrypted using the same encryption key that is used for encrypting the content.

In an alternative embodiment which is not shown by way of a figure, the request for the master key to the DRM server may be delegated by the CDN server to the ad decision server ADS. For that purpose, the CDN server may send a combined VAST+ master key request to the ad decision server ADS, e.g., by way of a message titled 'VAST+ Master key request STB1'. The ad decision server ADS may determine that 'Ad X' is to be inserted, and based on said determination, request the corresponding master key from the DRM server, e.g., by way of a message titled 'Request master key Ad X'. The ad decision server ADS may then send Ad X and the received master key to the CDN server, which may decrypt Ad X using the master key and then package and encrypt Ad-X using the encryption key for the primary content in a same or similar manner as described for the FIG. 6 embodiment.

Data Processing Entities

Figure 7:
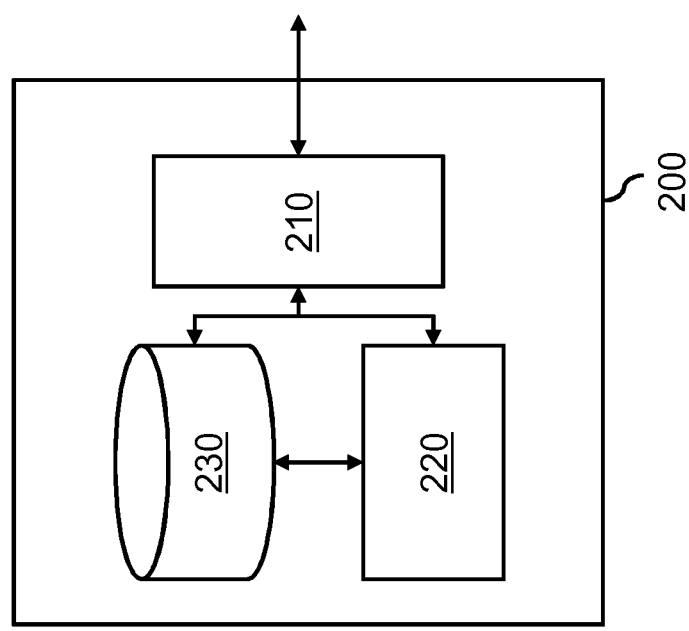
FIG. 7 shows a system which may represent a device implementing the receiver, or a server implementing the CDN server and/or the ad server.

FIG. 7 shows a system 200 which may represent a device implementing the receiver, or a server implementing the content deliver server and/or the ad server.

It can be seen that the system 200 may comprise a network interface 210 for communicating with (other) network nodes in the network. The network interface 210 may take any suitable form, including but not limited to a wired network interface based on Ethernet or optical fiber or a wireless network interface. FIG. 7 further shows the system 200 comprising a storage 230, such as a hard disk, a solid-state drive, or an array thereof, which may be used by the system 200 for storing data.

The system 200 may further comprise a processor 220 which may be configured, e.g., by hardware design or software, to perform the operations described with reference to FIGS. 1A-6 in as far as pertaining to the receiver, the content delivery server or the ad decision server. For example, the processor 220 may be embodied by a single Central Processing Unit (CPU) representing a single-processor processor system, but also by a combination or system of such CPUs and/or other types of processing units. In general, the system 200 may be embodied by a (single) device or apparatus, e.g., a network server or an end-user device. However, the system 200 may also be embodied by a distributed system of such devices or apparatuses.

In general, the receiver, the content delivery server and/or the ad decision server may be implemented at least in part by a device or apparatus. The device or apparatus may comprise one or more (micro)processors which execute appropriate software. Software implementing the functionality of any function(s) attributed to the receiver or either server may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

Figure 8:
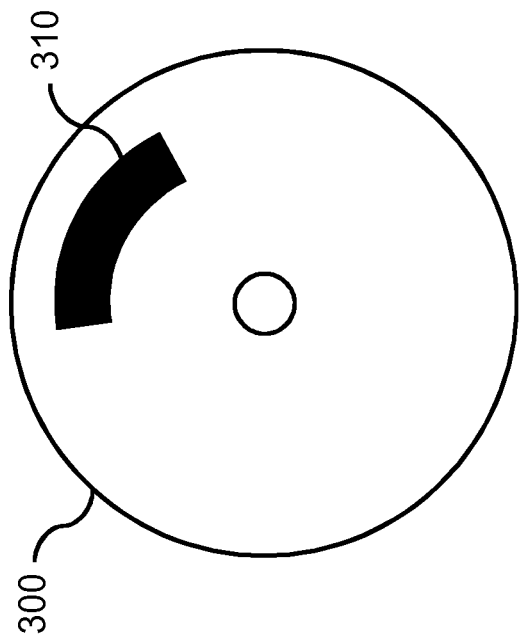
FIG. 8 shows a computer readable medium comprising non-transitory data comprising instructions for causing a processor system to perform the method.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 300 as for example shown in FIG. 8, e.g., in the form of a series 310 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows by way of example an optical storage device 300.

Figure 9:
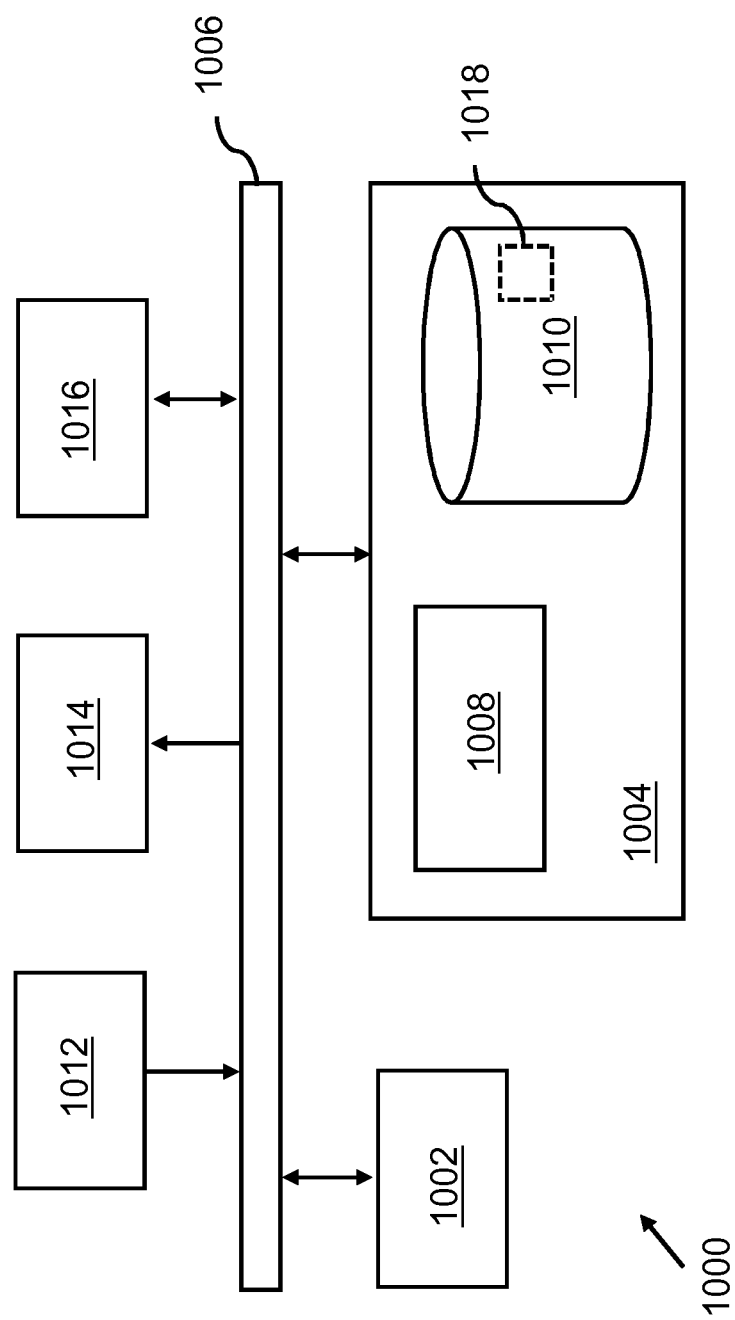
FIG. 9 shows an exemplary data processing system.

FIG. 9 is a block diagram illustrating an exemplary data processing system that may be used in the embodiments described in this specification. Such data processing systems include data processing entities described in this specification, including but not limited to data processing entities implementing functions such as but not limited to the receiver, the content delivery server, the ad decision server, etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 9, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the receiver. In that case, application 1018 may represent an application that, when executed, configures data processing system 1000 to perform the functions described herein with reference to the receiver. In another aspect, data processing system 1000 may implement the content delivery server. In that case, application 1018 may represent an application that, when executed, configures data processing system 1000 to perform the functions described herein with reference to the content delivery server. In another aspect, data processing system 1000 may implement the ad decision server. In that case, application 1018 may represent an application that, when executed, configures data processing system 1000 to perform the functions described herein with reference to the ad decision server.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of enabling insertion of secondary content in a time slot of primary content using a managed content delivery network configured for IPTV delivery, the method comprising:

via the managed content delivery network, providing the primary content to a receiver for play-out by the receiver, the primary content being encrypted with a first encryption key and decryptable with a first decryption key;

via the managed content delivery network, providing insertion metadata to the receiver indicating the time slot in the primary content for the insertion of the secondary content;

via the managed content delivery network, providing the secondary content to the receiver, the secondary content being encrypted with a second encryption key and decryptable with a second decryption key which is different from the first decryption key; and pre-caching the second decryption key at the receiver before the receiver reaches a start of the time slot during play-out of the primary content, thereby enabling the receiver to decrypt the secondary content with the second decryption key before or during play-out of the secondary content;

wherein the primary content, the insertion metadata and the secondary content are provided to the receiver by a content delivery server which is located in the managed content delivery network;

the method further comprising, at the content delivery server:

detecting the time slot in the primary content on the basis of the insertion metadata;
in response to said detection of the time slot, requesting a content identifier of the secondary content from a secondary content decision server allowing the secondary content to be retrieved from the managed content delivery network;
providing the secondary content to the receiver;
requesting the second decryption key from a digital rights management server on the basis of the content identifier of the secondary content; and
providing the second decryption key to the receiver;
the method further comprising, at the secondary content decision server and in response to the request for the content identifier of the secondary content from the content delivery server:
providing a server identifier together with the secondary content to the content delivery server, the server identifier identifying the digital rights management server providing the second decryption key.

2. The method according to claim 1, wherein the secondary content represents personalized content which is selectively provided to the receiver or a group of receivers which includes the receiver.

3. The method according to claim 1, wherein providing the secondary content to the receiver comprises, at the content delivery server:
inserting the secondary content in the time slot of the primary content to obtain combined primary and secondary content; and
providing the combined primary and secondary content to the receiver.

4. The method according to claim 1, further comprising, at the secondary content decision server:
in response to the request for the content identifier of the secondary content from the content delivery server, requesting the second decryption key from a digital rights management server on the basis of the content identifier of the secondary content; and
providing the second decryption key together with the content identifier of the secondary content to the content delivery server for delivery to the receiver.

5. The method according to claim 1, wherein providing the second decryption key to the receiver comprises, at the content delivery server:
inserting the secondary content and the second decryption key in a same data container, such as a same media stream; and
providing the data container to the receiver.

6. The method according to claim 3, further comprising:
at the content delivery server, signaling the receiver that the combined primary and secondary content received by the receiver contains the secondary content;
at the receiver and in response to said signaling, requesting the second decryption key from a digital rights management server on the basis of the content identifier of the secondary content;
wherein optionally said signaling comprises providing a server identifier to the receiver, the server identifier identifying the digital rights management server providing the second decryption key.

7. The method according to claim 1, further comprising, at the receiver:
detecting the time slot in the primary content on the basis of the insertion metadata;
in response to said detection of the time slot, requesting a content identifier of the secondary content from a secondary content decision server allowing the secondary content to be retrieved from the managed content delivery network; and
requesting the second decryption key from a digital rights management server on the basis of the content identifier of the secondary content.

8. The method according to claim 1, wherein requesting the content identifier of the secondary content from the secondary content decision server comprises sending a Video Ad Serving Template (VAST) request to the secondary content decision server.

9. The method according to claim 1, wherein the primary content is encoded as a media stream, wherein the insertion metadata is constituted by one or more markers in the media stream, such as SCTE-35 markers, and wherein detecting the time slot in the primary content on the basis of the insertion metadata comprises detecting the one or more markers in the media stream.

10. A non-transitory computer-readable storage device comprising a computer program, the computer program comprising instructions for causing a processor system to perform the method steps according to claim 1 in as far as defined for the receiver, the content delivery server or the secondary content decision server.

11. A device configured as the receiver as defined by claim 1, comprising:
a network interface for receiving, via a managed content delivery network:
primary content, encrypted with a first encryption key and decryptable with a first decryption key;
insertion metadata indicating a time slot in the primary content for insertion of secondary content; and
the secondary content, encrypted with a second encryption key and decryptable with a second decryption key which is different from the first decryption key;
a processor system configured to:
play-out the primary content;
pre-cache the second decryption key before a start of the time slot is reached during play-out, for example by requesting the second decryption key from a digital rights management server on the basis of a content identifier of the secondary content before the start of the time slot or by receiving the second decryption key via the managed content delivery network; and
decrypt the secondary content with the second decryption key before or during play-out of the secondary content.

12. A network node or a distributed system of network nodes configured as the content delivery server as defined by claim 1, comprising:
a network interface for providing to a receiver:
primary content, encrypted with a first encryption key and decryptable with a first decryption key;
insertion metadata indicating a time slot in the primary content for insertion of secondary content;
a processor system configured to:
detect the time slot in the primary content on the basis of the insertion metadata;
via the network interface and in response to said detection of the time slot, request a content identifier of the secondary content from a secondary content decision server allowing the secondary content to be retrieved from the managed content delivery network, the secondary content being encrypted with a second encryption key and decryptable with a second decryption key which is different from the first decryption key;

via the network interface, provide the secondary content to the receiver while additionally providing to the receiver:

the second decryption key as previously obtained by content delivery server from a digital rights management server, or signaling to cause the receiver to request the second decryption key from the digital rights management server.

* * * * *